(12) United States Patent
Schmitt et al.

(10) Patent No.: US 10,877,137 B2
(45) Date of Patent: Dec. 29, 2020

(54) VEHICLE SENSING SYSTEM WITH ULTRASONIC TRANSDUCER

(71) Applicant: MAGNA ELECTRONICS INC., Auburn Hills, MI (US)

(72) Inventors: Werner Schmitt, Pohlheim (DE); Henry Kung, Zhubei (TW); Tzu-Nan Chen, Zhubei (TW); Helmut A. Wodrich, Clarkston, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 440 days.

(21) Appl. No.: 15/828,471

(22) Filed: Dec. 1, 2017

(65) Prior Publication Data

US 2018/0156901 A1    Jun. 7, 2018

Related U.S. Application Data

(60) Provisional application No. 62/429,203, filed on Dec. 2, 2016.

(51) Int. Cl.
*B06B 1/06* (2006.01)
*G01S 7/521* (2006.01)
(Continued)

(52) U.S. Cl.
CPC .............. *G01S 7/521* (2013.01); *G01S 15/87* (2013.01); *G01S 15/931* (2013.01); *G10K 9/122* (2013.01);
(Continued)

(58) Field of Classification Search
None
See application file for complete search history.

(56) References Cited

U.S. PATENT DOCUMENTS

| 3,816,671 | A | * | 6/1974 | Fraim | ..................... H04R 19/01 |
| | | | | | 381/114 |
| 3,864,666 | A | * | 2/1975 | Douglas | ................ B06B 1/0618 |
| | | | | | 367/126 |

(Continued)

FOREIGN PATENT DOCUMENTS

| DE | 19752921 A1 | * | 6/1999 | ............... G01H 1/00 |
| DE | 102010044996 A1 | * | 3/2012 | ........... B60R 19/483 |

(Continued)

*Primary Examiner* — Hovhannes Baghdasaryan
*Assistant Examiner* — Jonathan D Armstrong
(74) *Attorney, Agent, or Firm* — Honigman LLP

(57) ABSTRACT

A method of making a sensing unit for a sensing system of a vehicle includes providing a first housing portion, a second housing portion, and a transducer having a piezo element. The transducer is placed in the first housing portion at the closed transducer end of the first housing portion. A dampening ring is disposed in the first housing portion between the closed transducer end and the first open receiving end of the first housing portion. A compression ring is provided and disposed at least partially into the first open receiving end of the first housing portion with wires electrically connecting the piezo element to the pins of the compression ring in the first housing portion. A PCB is disposed in the second housing portion and electrically connected to terminals of a connector portion of the second housing portion. The first housing portion is attached to the second housing portion.

20 Claims, 18 Drawing Sheets

(51) Int. Cl.
*G10K 9/122* (2006.01)
*G10K 11/00* (2006.01)
*G01S 15/87* (2006.01)
*G10K 9/22* (2006.01)
*G01S 15/931* (2020.01)

(52) U.S. Cl.
CPC ............. *G10K 9/22* (2013.01); *G10K 11/004* (2013.01); *G01S 2015/938* (2013.01)

(56) References Cited

U.S. PATENT DOCUMENTS

| | | | | |
|---|---|---|---|---|
| 4,701,893 | A * | 10/1987 | Muller | G01S 15/101 367/137 |
| 4,872,148 | A * | 10/1989 | Kirby | G01H 11/06 367/172 |
| 5,079,752 | A * | 1/1992 | Bloomfield | G01S 7/521 367/104 |
| 5,207,101 | A * | 5/1993 | Haynes | G01F 23/2962 73/290 V |
| 5,949,331 | A | 9/1999 | Schofield et al. | |
| 7,390,978 | B2 * | 6/2008 | Dean | H01R 43/24 174/521 |
| 7,784,855 | B2 * | 8/2010 | Faass | G01D 11/30 293/117 |
| 8,013,780 | B2 | 9/2011 | Lynam | |
| 8,303,179 | B2 * | 11/2012 | Owen | G01K 1/14 374/178 |
| 9,233,641 | B2 | 1/2016 | Sesti et al. | |
| 9,403,501 | B2 | 8/2016 | Teng et al. | |
| 9,915,557 | B2 | 3/2018 | Wei et al. | |
| 10,234,548 | B2 | 3/2019 | Hsu et al. | |
| 10,324,181 | B2 * | 6/2019 | Horsley | B06B 1/0215 |
| 2009/0010494 | A1 * | 1/2009 | Bechtel | B60Q 1/1423 382/104 |
| 2009/0013782 | A1 * | 1/2009 | Theml | B60R 19/483 73/431 |
| 2010/0231093 | A1 * | 9/2010 | Li | G01S 7/521 310/334 |
| 2010/0245066 | A1 | 9/2010 | Sarioglu et al. | |
| 2011/0264012 | A1 * | 10/2011 | Lautzenhiser | A61N 7/00 601/2 |
| 2013/0096436 | A1 * | 4/2013 | Little | G01S 7/5205 600/459 |
| 2013/0214642 | A1 * | 8/2013 | Lin | B06B 1/0644 310/319 |
| 2013/0242099 | A1 | 9/2013 | Sauer et al. | |
| 2014/0373345 | A1 | 12/2014 | Steigerwald | |
| 2015/0008796 | A1 * | 1/2015 | Sun | B06B 1/0651 310/334 |
| 2015/0222795 | A1 | 8/2015 | Sauer et al. | |
| 2015/0266430 | A1 | 9/2015 | Mleczko et al. | |
| 2015/0365569 | A1 | 12/2015 | Mai et al. | |
| 2016/0037028 | A1 | 2/2016 | Biemer | |
| 2016/0268716 | A1 | 9/2016 | Conger et al. | |
| 2017/0133811 | A1 | 5/2017 | Conger et al. | |
| 2017/0184718 | A1 * | 6/2017 | Horsley | B06B 1/0215 |
| 2017/0295306 | A1 | 10/2017 | Mleczko | |
| 2017/0302829 | A1 | 10/2017 | Mleczko et al. | |
| 2018/0072239 | A1 | 3/2018 | Wienecke et al. | |
| 2019/0302063 | A1 * | 10/2019 | Hadimioglu | B06B 1/067 |

FOREIGN PATENT DOCUMENTS

| | | | | |
|---|---|---|---|---|
| DE | 102010045971 | A1 * | 3/2012 | ........... B60R 19/483 |
| EP | 2808694 | B1 * | 9/2017 | ........... G10K 11/004 |
| WO | 2011090484 | A1 | 7/2011 | |
| WO | WO-2014016288 | A1 * | 1/2014 | ........... G01S 7/521 |

* cited by examiner

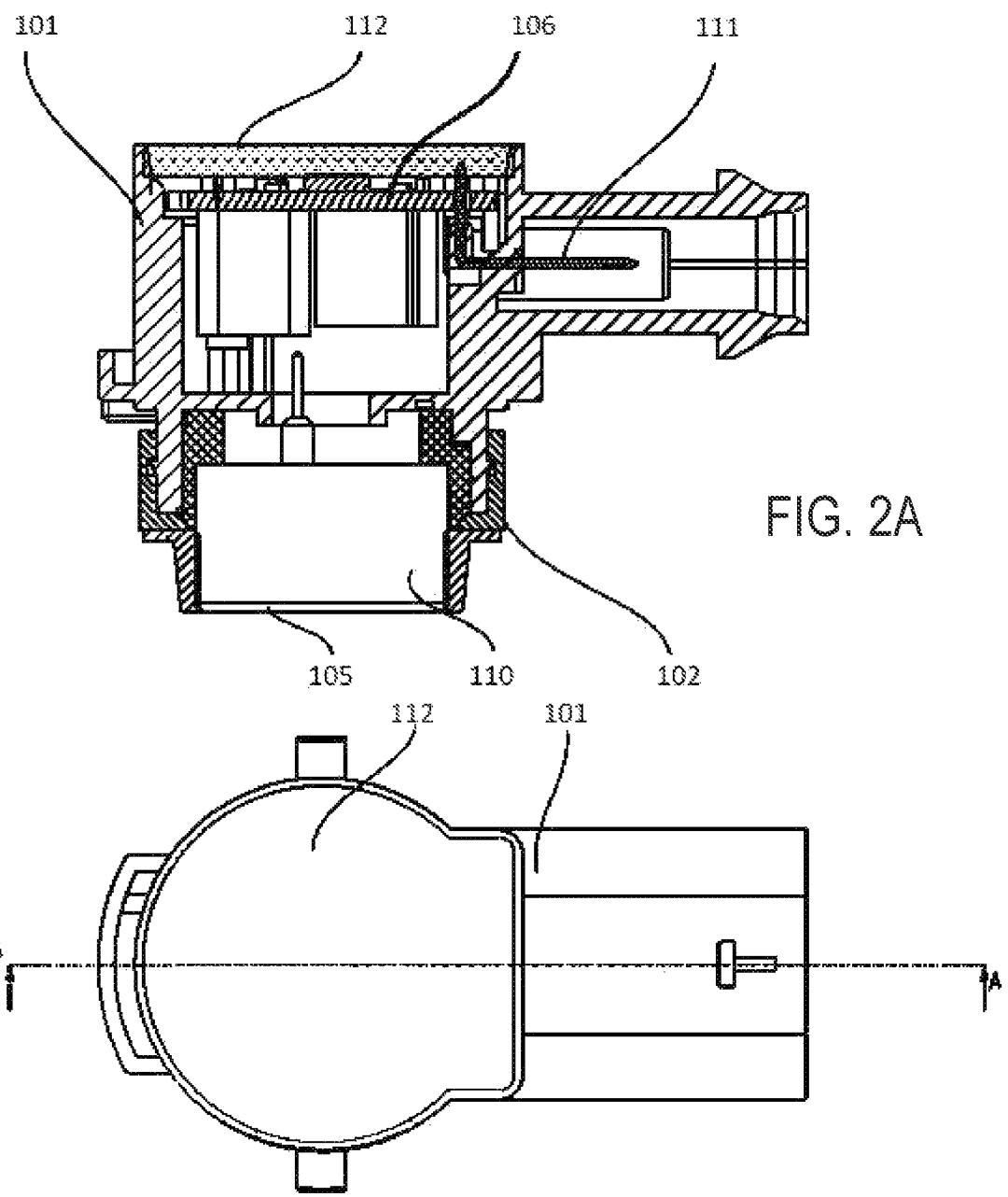

| Drawing pos. | Drawing description |
|---|---|
| 1 | Connector housing |
| 2 | Transducer housing |
| 3 | Compression ring |
| 4 | Damping ring |
| 5 | Membrane |
| 6 | PCBA |
| 7 | Adaptor pins, press fit |
| 8 | Piezo |
| 9 | Absorber material |
| 10 | Wire |
| 11 | Connector pins, pressfit |
| 12 | pressfit holes |
| 13 | top assembly |
| 14 | bottom assembly |
| 15 | full assembly |
| 16 | weld seam |
| 17 | conductor joint |
| 101 | Connector housing |
| 102 | transducer housing |
| 105 | Membrane |
| 106 | PCBA |
| 110 | transducer assembly |
| 111 | Connector pins, pressfit |
| 112 | rear lid |

FIG. 2B

PAS 25

PAS 3.0

PAS 3.0

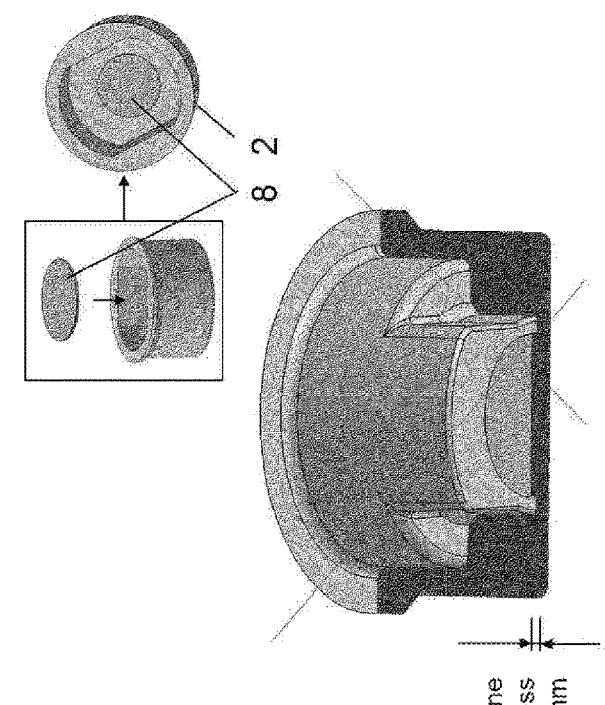

Process
- Align and pasting
- UV Curing

Part
- Aluminum Housing (2) (membrane)
  - Process: Forged + CNC
  - Material: To be analyzed (Speculate: 6k series aluminum alloy, will be sent for XFR)
  - To achieve ± 1kHz Natural Resonance Freq. Tolerance of membrane: ±0.008mm = 8 μm
  - One of the supplier suggest Double Disk Grinding(DDG) to control this tolerance
- Piezo (8)
  - Thickness= 0.15~0.25 mm
  - Diameter ~ 7mm
- Adhesive (not visible)
  - UV-cured
  - Hardness
  - Bonding strength Membrane Thickness ~0.5 ±0.008mm

FIG. 9

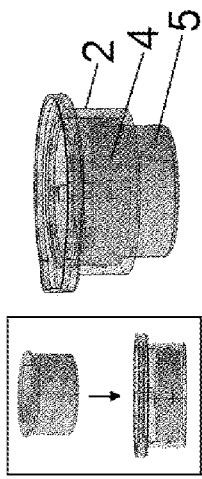

Process
- ASSY (Press)

Part
- Front Hsg(12) with Insert molding Damping Ring (2 and 4 become one piece)
  - 2K-shot Molding
    - 1st Shot (Exterior transparent part as show on right) (mono-part)
      - PA66+30%GF
      - Color: White, need transparency for Laser
    - 2nd Shot (inner green part as shown on right) (Silkongummi wird zugespritzt für aufhänngzung dre Meran)
      - Silicone Rubber (eingesprizt)
      - Color: Green/Red
      - Hardness: Shore A 30~40

FIG. 10

Process

— Wire-Bond
- Attaching wires (10) on the piezo (8) by vibration welding
- Attaching wires (10) on the connector joint metal pieces at the compressing ring (3) by soldering

Parts

— Wire (4) Potting material (9)
- Material
- Length=15mm
- Φ=0.08mm
- Power Rating: 350mA x 200Vrms

- Process
  - ASSY (Flip +Press)
- Parts
  - Pressing Ring (3/10)
    - Material: Same as housing
    - Snap hook design (for assembly)
    - PA66+30%GF
    - Color: Black, no transparency
    - Pins:
      - Press fit
        Press fit spec Comply with IEC 60325-5

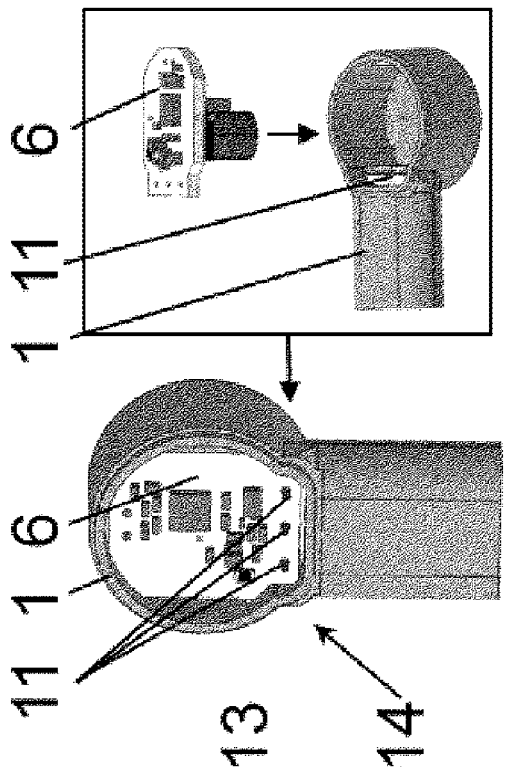
- Process
  - ASSY Press-in Force
    - Depend on Press-fit pin x3
    - Estimate around 150N
    - Jig(Press head) design
- Parts
  - Rear Hsg with Insert-mold Press-fit pins (1) +PCBA (6)
    - Insert Molding
      - PA66+30%GF
      - Color: Black, no transparency
      - With insert Molding Pins (11)
        - PCB side: Press fit spec complies with IEC 60325-5
      - Connector Side: 1 x 0.6 mm
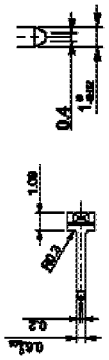
FIG. 14

- Process
  - ASSY Press-in Force
    - Depend on Press-fit pin x2
    - Estimate 100N
    - Jig(Press head) design

8. Laser Welding

- Process
  - Laser Welding
    - Equipment
      - Power
      - Laser Wavelength
      - Pattern Type

- Material
  - PA66 (any specific brand/model more suitable for the purpose
  - Glass fiber affiliation (currently 30%)
  - Transparency requirement

- Water proof level for Laser welding process
  - Bonding Strength (PA66)
  - IP9k/IP6k examples?

- Parallel after laser welding (Causing Transducer tilt)
  - Uniformed welding thickness ~0.05
  - Worst Case: If one side welded at close to 0mm displacement, one side with 0.05mm, from my current concept model size there will be around max 0.1 degree tilt on sensor surface.

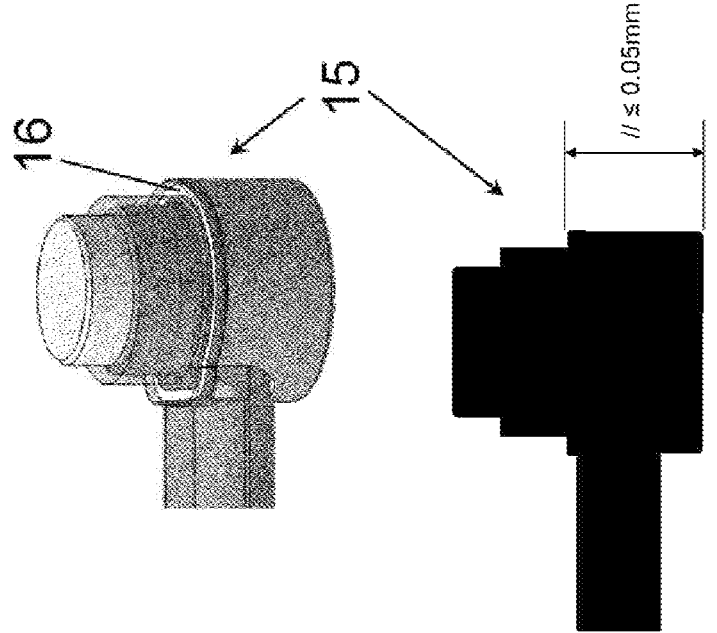

FIG. 16

VEHICLE SENSING SYSTEM WITH ULTRASONIC TRANSDUCER

CROSS REFERENCE TO RELATED APPLICATION

The present application claims the filing benefits of U.S. provisional application Ser. No. 62/429,203, filed Dec. 2, 2016, which is hereby incorporated herein by reference in its entirety.

FIELD OF THE INVENTION

The present invention relates generally to a vehicle sensing system for a vehicle and, more particularly, to a vehicle sensing system that utilizes one or more ultrasonic sensors at a vehicle.

BACKGROUND OF THE INVENTION

Use of imaging and ultrasonic and radar sensors in vehicle sensing systems is common and known. Examples of such known systems are described in U.S. Pat. Nos. 8,013,780 and 5,949,331, which are hereby incorporated herein by reference in their entireties.

Common automotive ultrasound transducers consist of a PCB with a housing, a connector and a membrane with a piezo element attached to it. The piezo element is typically mechanically disconnected for free vibrating. Often the transducer assembly with the piezo element is purchased separately for being assembled onto a transducer connector housing with PCB. A known automotive ultrasound transducer is shown in FIGS. 2 and 2A, with the legend shown in FIG. 2B. As can be seen in FIG. 2A, the connector housing has a top opening for receiving the transducer housing and a bottom opening for applying the PCBA to the transducer assembly. Typically, there are some significant process steps for aligning and electrically contacting the transducer to the assemblies PCB.

SUMMARY OF THE INVENTION

The present invention provides a driver assistance system or sensing system for a vehicle that utilizes one or more ultrasound sensors to sense regions exterior of the vehicle. The ultrasound sensor unit is assembled via a method comprising providing a transducer having a piezo element and placing the transducer at a first housing portion. A dampening ring is provided around the first housing portion, and wires are attached and electrically connected to the piezo element to pins of a compression ring. The first housing portion is pressed into the compression ring. A second housing portion is provided and a PCB is placed in the second housing portion. The first housing portion is attached at the second housing portion, and electrical connection is made between the pins and electrical connectors of the PCB of the second housing portion.

These and other objects, advantages, purposes and features of the present invention will become apparent upon review of the following specification in conjunction with the drawings.

BRIEF DESCRIPTION OF THE DRAWINGS

FIGS. 2 and 2A are views of a known ultrasound transducer;

FIG. 2B is a legend of the reference numbers in the drawings;

FIGS. 9-16 show details of the respective ones of the eight steps of FIG. 8.

DESCRIPTION OF THE PREFERRED EMBODIMENTS

Figure 1:
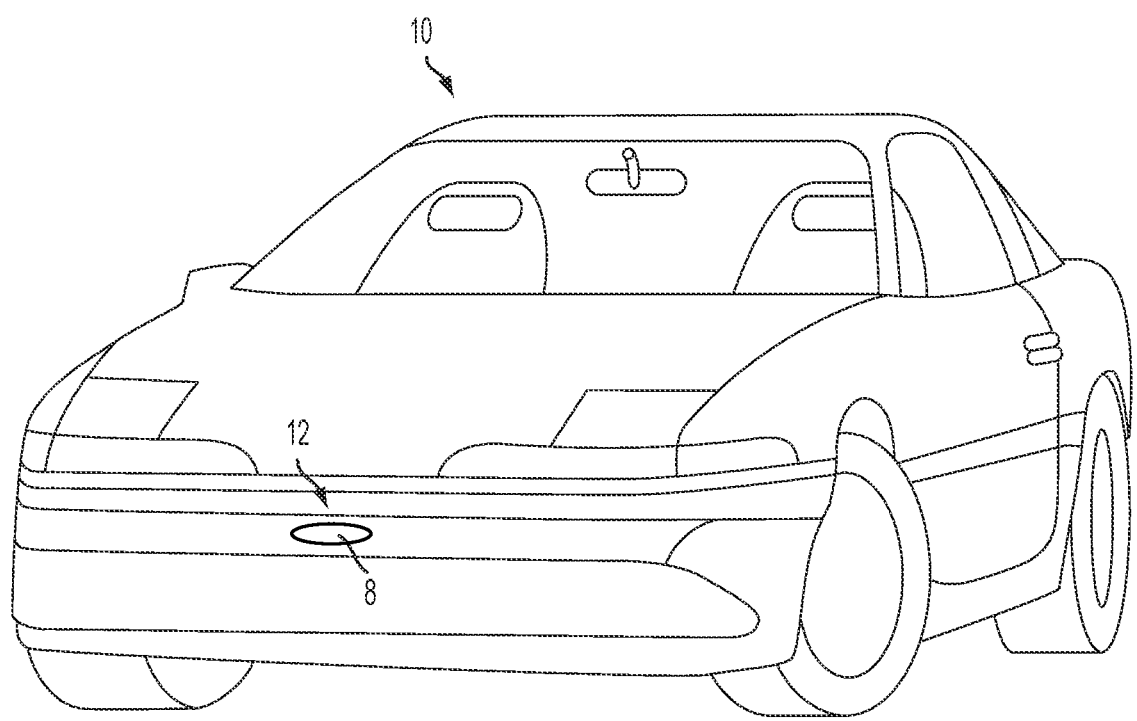
FIG. 1 is a perspective view of a vehicle having a sensing system in accordance with the present invention.
Figure 3A:
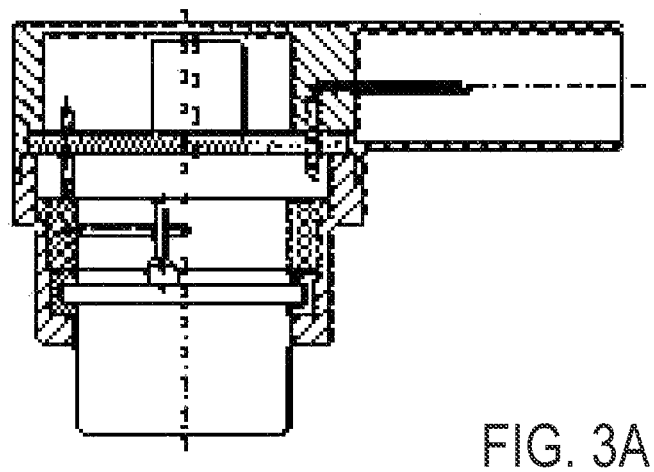
FIGS. 3A, 3B, 4A, 4B are sectional views of a sensing unit or assembly of the present invention.
Figure 3B:
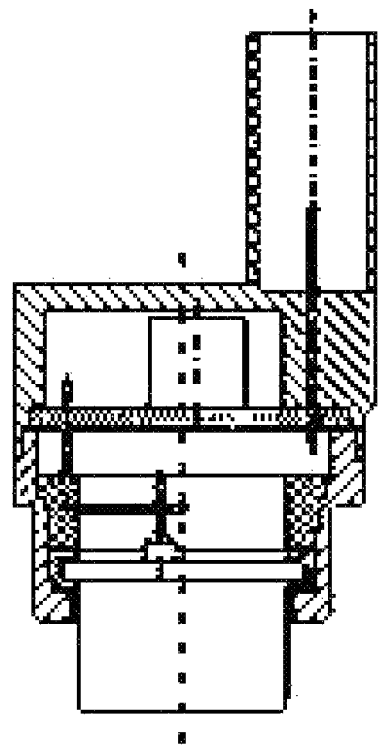
Figure 4A:
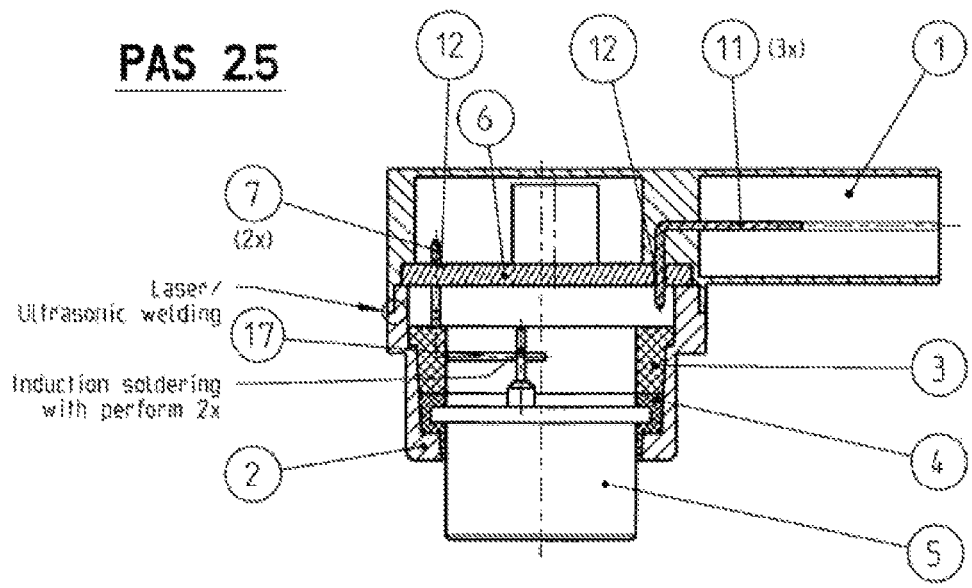
Figure 4B:
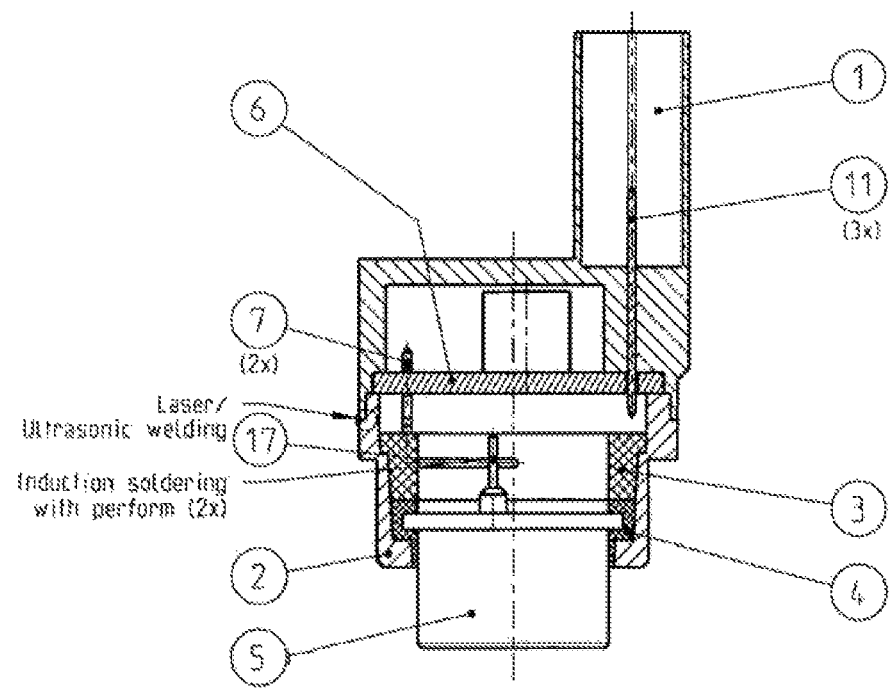
Figure 4C:
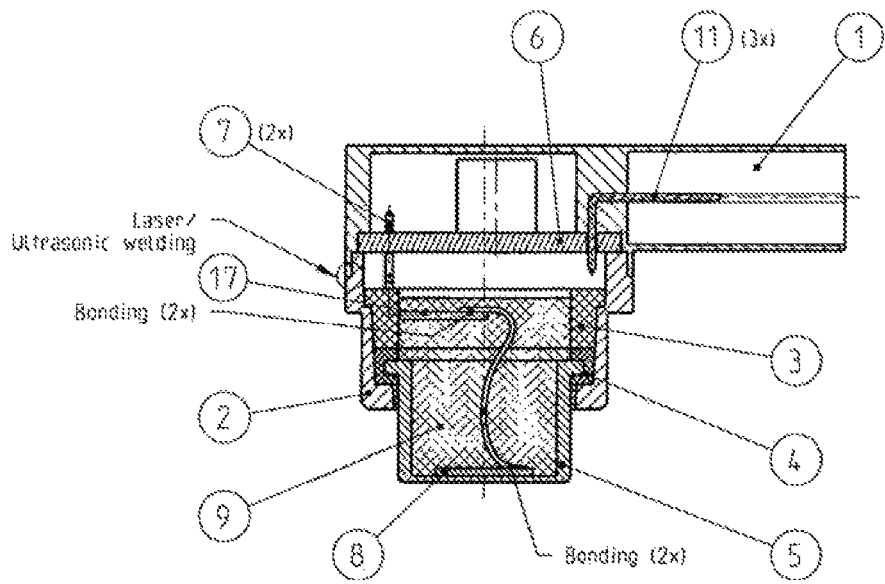
FIGS. 4C, 4D are sectional views of another sensing unit or assembly of the present invention.
Figure 4D:
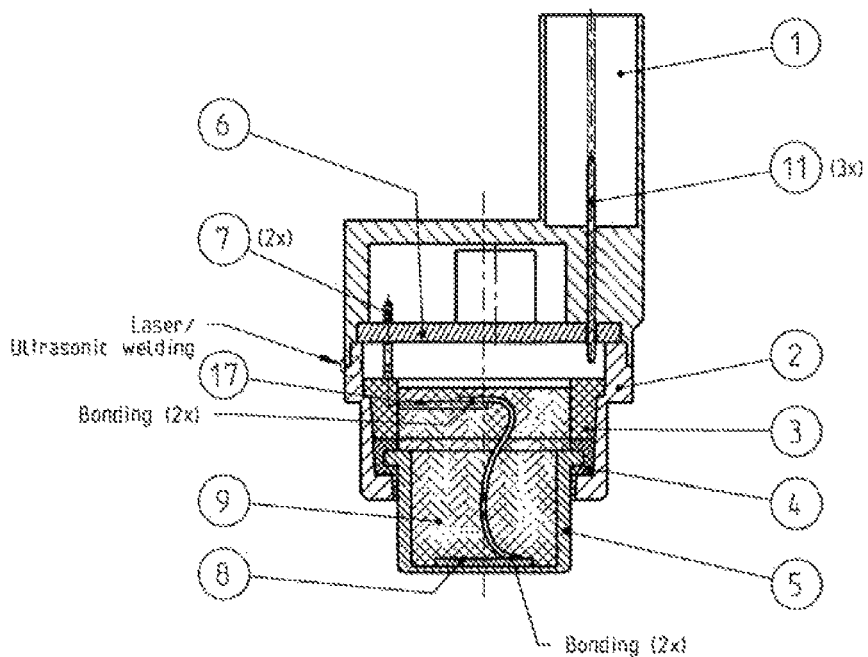
Figure 5:
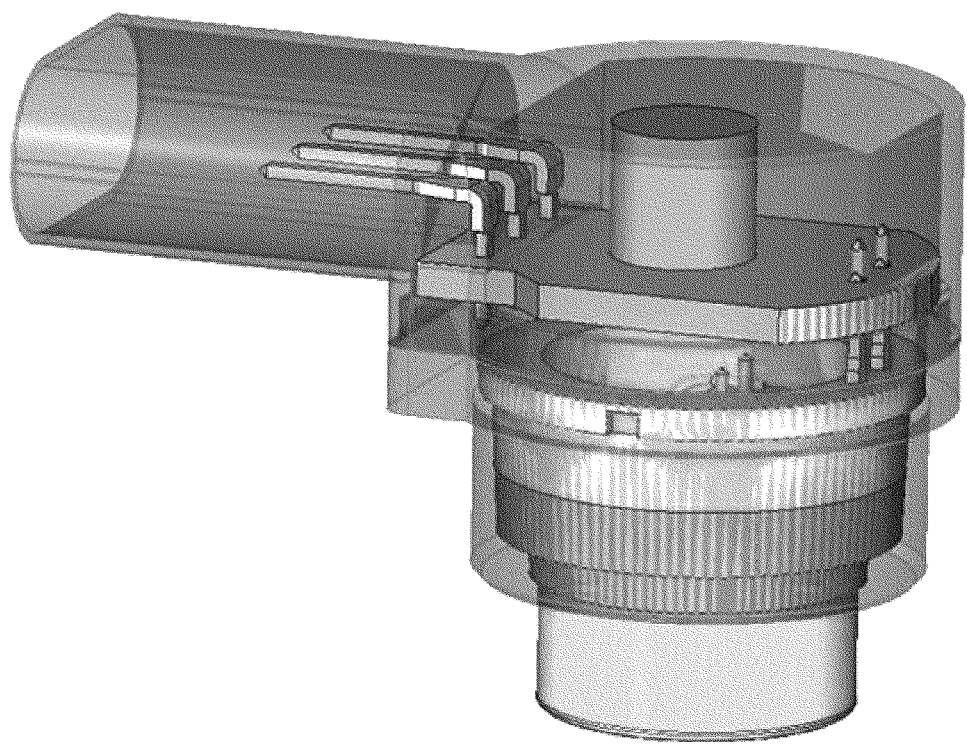
FIG. 5 is a perspective view (showing internal components) of the sensing unit of FIGS. 3A, 3B, 4A, 4B.
Figure 6A:
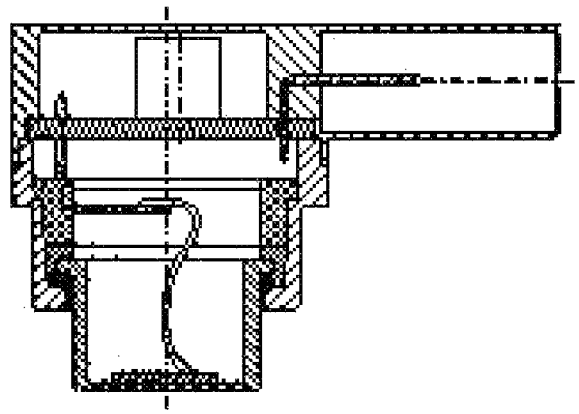
FIGS. 6, 6A and 6B are views of the sensing unit or assembly of FIGS. 4C, 4D.
Figure 6B:
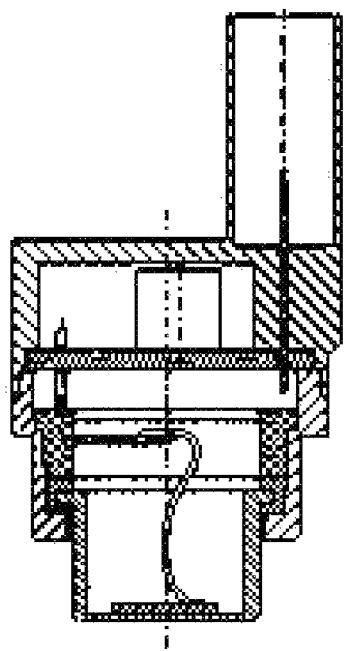
Figure 6:
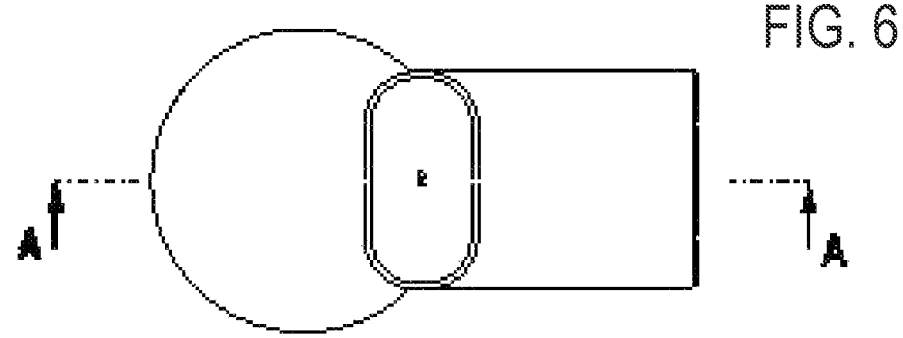
Figure 7:
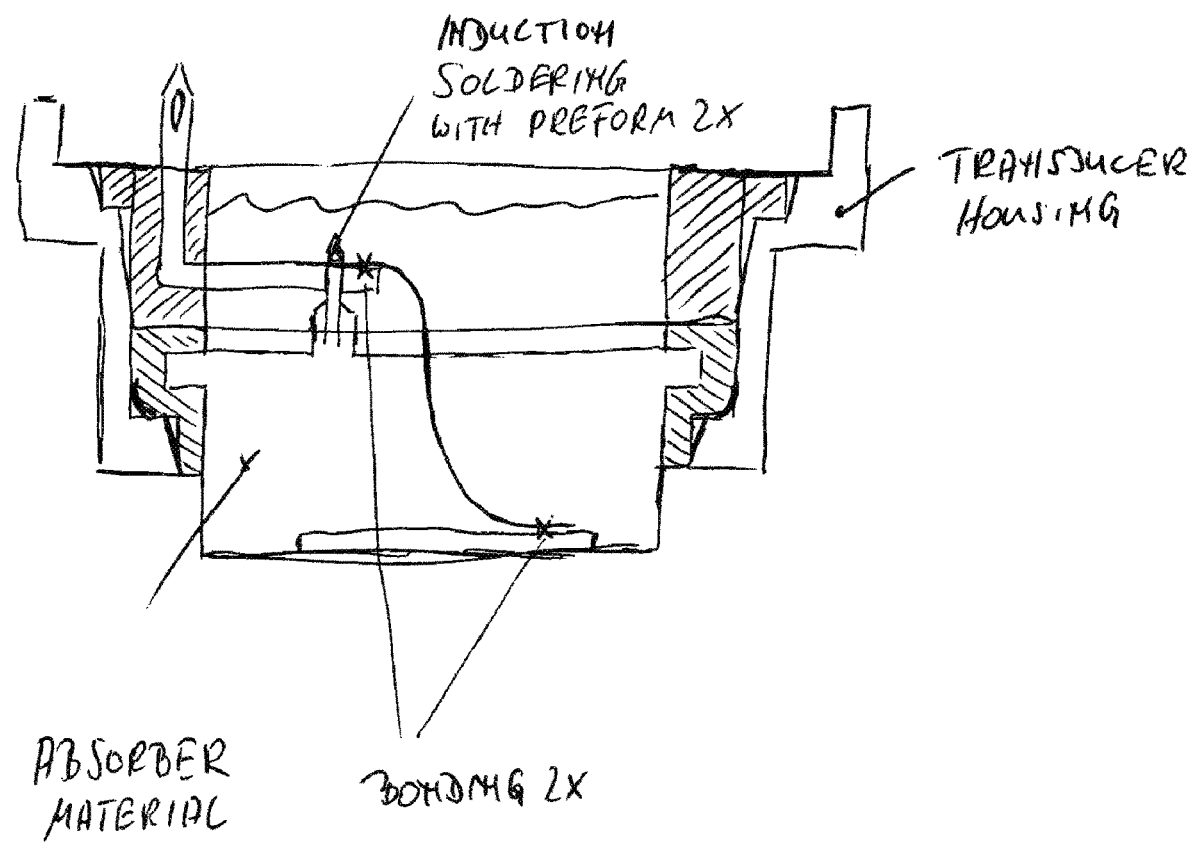
FIG. 7 is an enlarged sectional view of a portion of the sensing unit.

A vehicle sensing system and/or driver assist system and/or object detection system and/or alert system operates to capture image data and/or sensing data exterior of the vehicle and may process the captured data to display images and to detect objects at or near the vehicle and in the predicted path of the vehicle, such as to assist a driver of the vehicle in maneuvering the vehicle in a forward or rearward direction. The vision system includes a processor that is operable to receive image data and/or sensing data from one or more cameras/sensors and provide an output, such as a display output to a display device for displaying images representative of the captured image data. Optionally, the vision system may provide display, such as a rearview display or a top down or bird's eye or surround view display or the like.

Referring now to the drawings and the illustrative embodiments depicted therein, a vehicle 10 includes an driver assistance system or sensing system 12 that includes at least one ultrasound sensor unit, such as a forward facing sensor unit 8 (and the system may optionally include multiple exterior facing sensors, such as cameras or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle.

In accordance with an aspect of the present invention, an advanced vehicle ultrasound transducer design with advantageous assembly steps is provided.

One solution for assemblies with separately purchased transducer assembly 110 is shown in FIGS. 3A, 3B, 4A, 4B and 5 under 'PAS 2.5'. The connector housing 1 does not have a bottom opening with a rear lid (such as rear lid 112 of the prior art transducers). The connector housing 1 has insert molded pins 11 reaching both into the connector inside acting as connector pins and reaching into the housings inside, having a press fit capable front end at which the (readily assembled) PCB 6 gets attached to by press fitting. A compressing ring 3 has insert molded press fit pins 7 for electrically connecting the transducer assembly to the PCB at two press fit holes 12 of the PCB. During assembly the compressing ring applies pressing force onto the PCB and onto its own press fit pins for attaching the press fit connections. The transducer assembly may be attached to the pins 7 by induction soldering. To mechanically detach the transducer assembly, the transducer housing 2 has a rubber or foam like dampening ring inlay 4 (extruded or done in a two-step molding process).

A solution for assemblies including the assembly of the transducer is shown in FIGS. 4C, 4D, 6, 6A, 6B and 7 under 'PAS 3.0'.

As shown in the exemplary FIG. 4, the transducer's connectors may be straight (0°) or angled (90°) both using the assembly process according the invention, discussed below.

Figure 8:
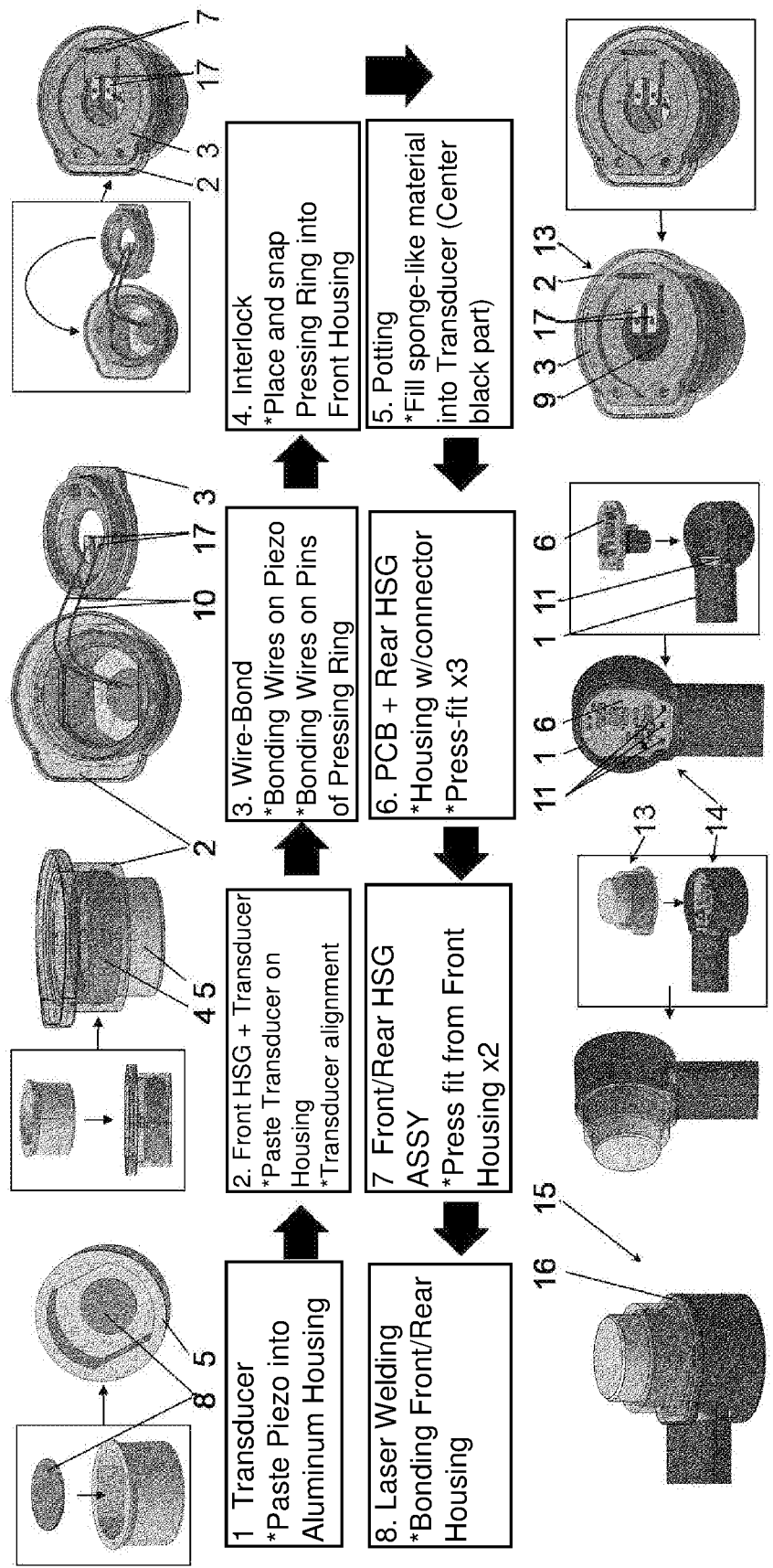
FIG. 8 is a schematic of eight steps in the assembly process of the sensing unit or assembly of the present invention.
Figure 11:
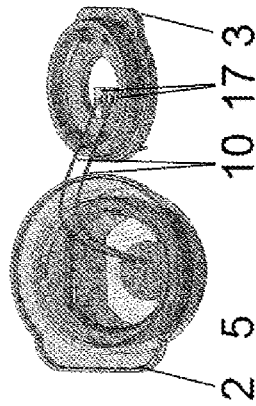
Figure 12:
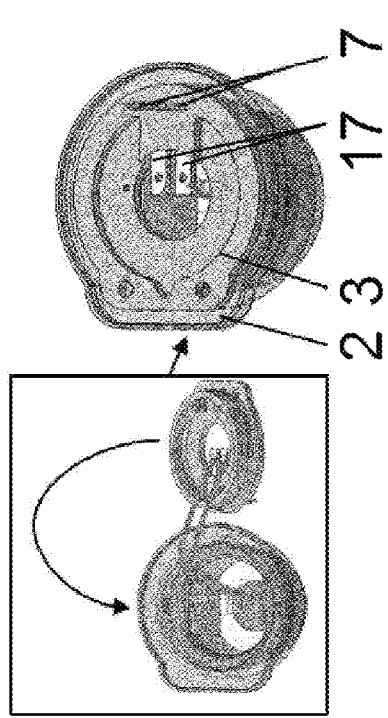

The assembly process summary is shown in FIG. 8. The single assembly process steps one to eight (in FIG. 8) according the invention are individually shown and detailed in FIGS. 9, 10, 11, 12, 13, 14, 15 and 16, discussed below.

At the first step (FIG. 9), the piezo element 8 gets pasted into the membrane 5, which is a stamped or sintered Aluminum cup. Then this cup is inserted into a transducer housing molding part 2. The transducer housing 2 has a dampening ring 4 (FIG. 10) inside (extruded or done in a twostep molding process). The transducer is disposed in the transducer housing at the dampening ring, and wires of the transducer extend from the transducer for electrical connection to a compression ring or compressing ring 3.

The compressing ring 3 (FIG. 11) has two conductor joints or pins or terminals 17. Two wires 10 are attached to the piezo element by vibration welding and attached to the conductor joints 17 by either vibration welding as well or soldering.

Figure 13:
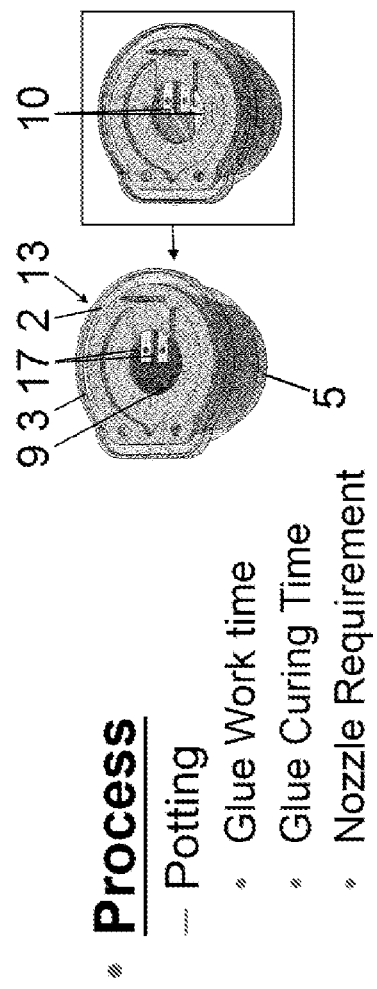
Figure 15:
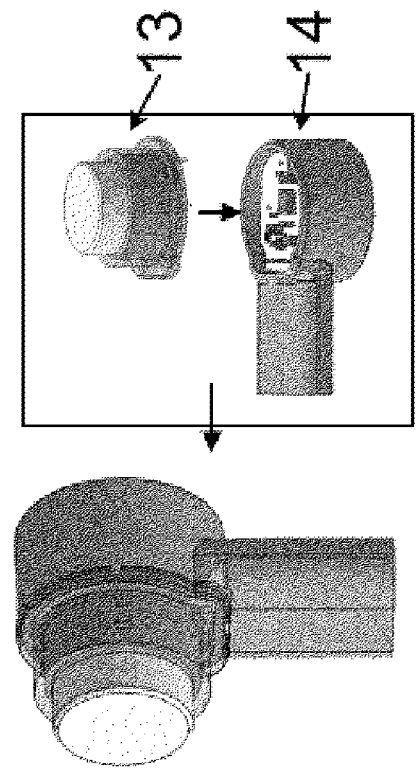

The compressing ring's conductor joint's other ends stick out of the compressing ring, having press fit capable ends or terminals. These are stuck or pressed into the press fit holes 12 of the PCB in step seven (FIG. 15). In step four (FIG. 12), the compressing ring is placed or put onto the top of the membrane cup and is held in place by clips, or may be held by a form fit or press fit construction. The membrane cup 5 gets filled by an absorber material 9 in step 5 (FIG. 13). Optionally, the absorber material comprises a two component epoxy (A/B) potting material or the like, such as, for example, Sonderhoff's commercially available FERMASIL 1809-1 or the like.

In step six (FIG. 14), the PCB gets put onto the press fit spike-like connector pins or terminals 11 of the connector housing 1. The connector pins or terminals protrude from the connector portion of the housing and into the cavity that receives the PCB therein. The connector portion is configured to connect to a connector end of a wire or wire harness of the vehicle when the sensing module is disposed at the vehicle. The compressing ring 3 puts force onto the PCB when the transducer assembly 13 gets put (pressed) onto the bottom assembly 14 in step seven (FIG. 15). For tightening the assembly, the joint between 13 and 14 gets laser welded (FIG. 16). Optionally, the transducer housing's (2) mold has a high transmissivity to LASER light of the welding LASER for not blocking the LASER, and the connector housing's (1) mold may have a low transmissivity to LASER light of the welding LASER for absorbing the heat fast for fast welding.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method of making an ultrasonic sensing unit for an ultrasonic sensing system of a vehicle, said method comprising:
   providing a first housing portion comprising a first open receiving end and a transducer end, the transducer end having an opening;
   providing a transducer having a piezo element, the transducer comprising a transducer housing with the piezo element disposed at one end of the transducer housing and an attaching flange at the other end of the transducer housing;
   providing a dampening ring at and around the attaching flange of the transducer housing, wherein the opening at the transducer end of the first housing portion has a cross dimension that is smaller than a cross dimension of the dampening ring at the attaching flange;
   inserting the transducer and the dampening ring into the first open receiving end of the first housing portion and disposing the dampening ring and attaching flange at the transducer end of the first housing portion;
   providing a compression ring having electrically conductive pins protruding therefrom;
   electrically connecting wires of the piezo element to the pins of the compression ring;
   pressing the compression ring at least partially into the first open receiving end of the first housing portion and pressing the compression ring against the dampening ring with the wires electrically connecting the piezo element to the pins of the compression ring in the first housing portion;
   providing a second housing portion comprising a connector portion configured to electrically connect to a connector of a wire harness of a vehicle;
   wherein the second housing portion has a second open receiving end;
   disposing a printed circuit board (PCB) in the second open receiving end of the second housing portion;
   wherein disposing the PCB in the second open receiving end of the second housing portion comprises electrically connecting the PCB to terminals of the connector portion; and
   attaching the first housing portion at the second housing portion, wherein attaching the first housing portion at the second housing portion comprises electrically connecting the pins of the compression ring at the first housing portion to the PCB at the second housing portion.

2. The method of claim 1, wherein attaching the first housing portion at the second housing portion comprises mating the first open receiving end of the first housing portion at the second open receiving end of the second housing portion.

3. The method of claim 1, wherein the second housing portion comprises structure having a rear wall opposite the second open receiving end at which the first housing portion is attached, and wherein the rear wall is formed as part of the second housing portion and is not removable therefrom.

4. The method of claim 1, wherein the first open receiving end of the first housing portion comprises an opening circumscribed by a wall of the first housing portion, and wherein the transducer is inserted into the first housing portion through the opening and disposed at the transducer end, which is opposite from the first open receiving end of the first housing portion.

5. The method of claim 1, wherein the second open receiving end of the second housing portion comprises an opening circumscribed by a wall of the second housing portion, and wherein the PCB is placed in the second housing portion through the opening.

6. The method of claim 1, wherein providing the dampening ring comprises molding the dampening ring around the attaching flange to at least partially encapsulate the attaching flange of the transducer housing.

7. The method of claim 1, wherein the terminals of the connecting portion are insert molded in the second housing portion.

8. The method of claim 1, wherein the terminals of the connecting portion are received through apertures of the PCB as the PCB is disposed in the second open receiving end of the second housing portion.

9. The method of claim 1, wherein disposing the PCB in the second open receiving end of the second housing portion comprises press fitting the PCB in the second open receiving end of the second housing portion.

10. The method of claim 1, wherein the first housing portion has a first cross dimension at the transducer end and a second cross dimension at the first open receiving end, and wherein the second cross dimension is larger than the first cross dimension.

11. The method of claim 1, wherein providing the dampening ring at and around the attaching flange of the transducer housing comprises insert molding the dampening ring at the transducer housing.

12. The method of claim 1, wherein attaching the first housing portion at the second housing portion comprises partially receiving the first open receiving end of the first housing portion at the second open receiving end of the second housing portion.

13. The method of claim 1, wherein attaching the first housing portion at the second housing portion comprises laser welding the first and second housing portions together.

14. A method of making an ultrasonic sensing unit for an ultrasonic sensing system of a vehicle, said method comprising:
   providing a first housing portion comprising a first open receiving end and a transducer end, the transducer end having an opening;
   providing a transducer having a piezo element, the transducer comprising a transducer housing with the piezo element disposed at one end of the transducer housing and an attaching flange at the other end of the transducer housing;
   providing a dampening ring at and around the attaching flange of the transducer housing, wherein the opening at the transducer end of the first housing portion has a cross dimension that is smaller than a cross dimension of the dampening ring at the attaching flange;
   inserting the transducer and the dampening ring into the first open receiving end of the first housing portion and disposing the dampening ring and attaching flange at the transducer end of the first housing portion;
   providing a compression ring having electrically conductive pins protruding therefrom;
   electrically connecting wires of the piezo element to the pins of the compression ring;
   pressing the compression ring at least partially into the first open receiving end of the first housing portion and pressing the compression ring against the dampening ring with the wires electrically connecting the piezo element to the pins of the compression ring in the first housing portion;
   providing a second housing portion comprising a connector portion configured to electrically connect to a connector of a wire harness of a vehicle;
   wherein the second housing portion has a second open receiving end;
   wherein the second housing portion comprises structure having a rear wall opposite the second open receiving end at which the first housing portion is attached, and wherein the rear wall is formed as part of the second housing portion and is not removable therefrom;
   disposing a printed circuit board (PCB) in the second open receiving end of the second housing portion;
   wherein disposing the PCB in the second open receiving end of the second housing portion comprises electrically connecting the PCB to terminals of the connector portion;
   wherein the terminals of the connecting portion are insert molded in the second housing portion;
   attaching the first housing portion at the second housing portion, wherein attaching the first housing portion at the second housing portion comprises electrically connecting the pins of the compression ring at the first housing portion to the PCB at the second housing portion; and
   wherein attaching the first housing portion at the second housing portion comprises mating the first open receiving end of the first housing portion at the second open receiving end of the second housing portion.

15. The method of claim 14, wherein the terminals of the connecting portion are received through apertures of the PCB as the PCB is disposed in the second open receiving end of the second housing portion.

16. The method of claim 14, wherein providing the dampening ring at and around the attaching flange of the transducer housing comprises insert molding the dampening ring at the transducer housing.

17. A method of making an ultrasonic sensing unit for an ultrasonic sensing system of a vehicle, said method comprising:
   providing a first housing portion comprising a first open receiving end and a transducer end, the transducer end having an opening;
   providing a transducer having a piezo element, the transducer comprising a transducer housing with the piezo element disposed at one end of the transducer housing and an attaching flange at the other end of the transducer housing;
   disposing the transducer into the first open receiving end of the first housing portion so that the attaching flange is disposed at the transducer end of the first housing portion;
   wherein the first open receiving end of the first housing portion comprises an opening circumscribed by a wall of the first housing portion, and wherein the transducer is placed in the first housing portion through the opening and disposed at the transducer end, which is opposite from the first open receiving end of the first housing portion;
   providing a dampening ring in the first housing portion at the attaching flange and between the transducer end and the first open receiving end of the first housing portion;
   providing a compression ring having electrically conductive pins protruding therefrom, wherein the pins are insert molded in the compression ring;

electrically connecting wires of the piezo element to the pins of the compression ring;

pressing the compression ring at least partially into the first open receiving end of the first housing portion with the wires electrically connecting the piezo element to the pins of the compression ring in the first housing portion;

providing a second housing portion comprising a connector portion configured to electrically connect to a connector of a wire harness of a vehicle;

wherein the second housing portion has a second open receiving end;

disposing a printed circuit board (PCB) in the second open receiving end of the second housing portion;

wherein disposing the PCB in the second open receiving end of the second housing portion comprises electrically connecting the PCB to terminals of the connector portion;

wherein the terminals of the connecting portion are received through first apertures of the PCB as the PCB is disposed in the second open receiving end of the second housing portion; and attaching the first housing portion at the second housing portion, wherein attaching the first housing portion at the second housing portion comprises electrically connecting the pins of the compression ring at the first housing portion to the PCB at the second housing portion; and wherein electrically connecting the pins of the compression ring at the first housing portion to the PCB at the second housing portion comprises receiving the pins through second apertures of the PCB as the first housing portion is attached at the second housing portion.

18. The method of claim 17, wherein the second housing portion comprises structure having a rear wall opposite the second open receiving end at which the first housing portion is attached, and wherein the rear wall is formed as part of the second housing portion and is not removable therefrom.

19. The method of claim 17, wherein disposing the PCB in the second open receiving end of the second housing portion comprises press fitting the PCB in the second open receiving end of the second housing portion.

20. The method of claim 17, wherein the terminals of the connecting portion are press fit into the first apertures of the PCB as the PCB is disposed in the second open receiving end of the second housing portion, and wherein the pins of the compression ring are press fit into the second apertures of the PCB as the first housing portion is attached at the second housing portion.

* * * * *